Patented Oct. 4, 1932

1,880,977

UNITED STATES PATENT OFFICE

AUGUST J. PACINI, OF CHICAGO, ILLINOIS, ASSIGNOR TO SUN-A-SURED, INC., A CORPORATION OF DELAWARE

ANTIRICKETIC SUBSTANCES AND THE PRODUCTION THEREOF

No Drawing.    Application filed February 4, 1928.   Serial No. 252,050.

This invention relates to anti-ricketic products and the like, and with regard to certain more specific features, to the treatment of anti-ricketic and similar substances.

Among the several objects of the invention may be noted the treatment of substances which elaborate growth-producing substances, such as the so-called vitamin D. This invention includes the increased production of vitamin bodies from materials so constituted chemically as to permit this production. Other objects will be in part obvious and in part pointed out hereinafter.

The invention accordingly comprises the elements and combination of elements, steps and sequence of steps, features of synthesis and arrangements of parts which will be exemplified in the description hereinafter, and the scope of the application of which will be indicated in the following claims.

I have found that the growth-producing substance vitamin A is composed of several individual growth-producing components or substances. One of these components produces an anti-xerophthalmic effect which may comprise a separate vitamin. For the purpose of description in this invention this growth-producing, apparently anti-xerophthalmic lacking substance will be referred to as "vitamin $a$", and it is to be understood that the invention embodies the displacement of vitamin bodies from one form to another, as, for example, the displacement of vitamin $a$ to vitamin D, the latter being growth-producing and anti-ricketic. It is possible that this displacement is caused by a direct transformation of vitamin $a$ to vitamin D.

I have discovered that the lipoid cholesterol, as well as other lipoids, can be converted to vitamin D by the use of photocatalysts without using any of the various older accepted methods of irradiation. This discovery is outstanding in its signifiance, inasmuch as it has heretofore been considered that artificial ultra-violet, infra-red, or at least visible ray environment was necessary to effect such conversion. It is reasonably certain that the natural process of forming vitamins in plant life is not dependent upon these types of irradiation, since plants grown in absolute darkness contain nearly as much vitamin as those grown in the sunlight.

It is to be understood herein that by the term "substrate" is meant all substances of the class described including, for example, lipoids, which are capable of being activated with vitamins as set out hereinafter.

The invention may be described as follows:

Cholesterol, for an example, takes on the characteristics belonging to vitamin D through the use of photo-catalysts if it be refluxed in an inactive solvent in the presence of suitable photo-catalysts. The following two examples will illustrate the process:

Example A

Three grams of cholesterol are introduced into an Erlenmeyer flask of 250 cubic centimeter capacity. Seventy-five grams of chloroform, to perform as the solvent, and ½ g. of uranium acetate, as the photo-catalyst, are added to the cholesterol in the flask. The mixture is then refluxed for several hours, care being exercised to avoid too rapid ebullition. (If a few broken pieces of porous tile are added to the mixture in the flask, ebullition can be more successfully controlled.) At the end of the refluxion, the contents of the flask are filtered to remove the photo-catalyst, which may be used subsequently to perform the same function. The solution is now allowed to evaporate spontaneously to dryness, and the residue shows the following characteristics:

1. A quantitative lowering of the melting point, attributable only to the formation of a new substance.
2. A positive aniline reaction for vitamin D.
3. Positive spectrographic absorption changes, such as a change in band formations and polariscopic rotation.
4. An animal response for vitamin D.

All of these tests prove that vitamin D has been produced.

Example B

Three grams of cholesterol is dissolved in seventy-five cubic centimeters of carbon tetrachloride in a 250 cubic centimeter Erlenmeyer flask. One gram of pyrolusite is added to the solution. The mixture is carefully refluxed and evaporated to dryness as in Example A. The cholesterol again at the conclusion of the evaporation satisfies the tests enumerated in Example A, proving conclusively the presence of vitamin D.

Cholesterol need not be used as the substrate. In fact, any lipoid or suitable substance, such as, for example, yeast, typhoid bacilli cultures, vitamin a containing substances rapidly growing sarcomatæ, seed oils such as linseed, corn and the like, certain of the fungi and the ascomycetes and others of which the above are but class examples, will serve as substrates for the reaction.

Other photo-catalysts can be employed as above designated with equally good results. These useful photo-catalysts include copper salts, gold salts, platinum salts, iron salts, and the like. By photocatalysts herein, I mean to include such substances which are adapted to speed or enhance the speed of a photo-chemical reaction, involving visible or invisible light, including the infra-red rays, and which as a class are characterized by their being electronically unsaturated; that is, they possess one or more free valence electrons. It is my discovery that such photocatalysts, probably on account of their free valence electrons, effect the desired conversion to vitamin D when utilized in the above-described manner. Such photocatalysts function in a true catalytic manner, so that substantially complete, quantitive recovery of the unchanged catalysts may be achieved after a reaction has been carried to completion.

The invention comprises heating or refluxing a substrate and a photo-catalyst together in an inactive solvent, and subsequently removing this solvent.

The invention finds commercial expression in the synthesis of vitamin D for therapeutic purposes, as, for example, in the manufacture of tablets.

In view of the foregoing, it will be seen that the several objects of the invention are achieved and other advantageous results obtained.

As many changes could be made in carrying out the above objects without departing from the scope of the invention, it is intended that all matter contained in the above description shall be interpreted as illustrative and not in a limiting sense.

I claim:

1. The method of producing vitamins which comprises refluxing an inert-solvent solution of a substrate with a photo-catalyst.

2. The method of producing vitamins which comprises heating a lipoid in solution in an inert solvent with a photo-catalyst.

3. The method of producing vitamins which comprises refluxing an inert-solvent solution of cholesterol with uranium acetate as a catalyzer.

4. The method of producing vitamins which comprises refluxing an inert-solvent solution of cholesterol with uranium acetate as a catalyzer, subsequently filtering off the uranium acetate and allowing the inert solvent to evaporate.

In testimony whereof, I have signed my name to this specification this 1st day of February, 1928.

AUGUST J. PACINI.